United States Patent
Lundqvist et al.

(10) Patent No.: US 10,813,023 B2
(45) Date of Patent: Oct. 20, 2020

(54) HANDOVER BETWEEN A SOURCE ACCESS NODE AND A TARGET ACCESS NODE USING A CONTROL DEVICE

(71) Applicant: HUAWEI TECHNOLOGIES CO., LTD., Shenzhen, Guangdong (CN)

(72) Inventors: Henrik Lundqvist, Kista (SE); George Koudouridis, Kista (SE); Tao Cai, Kista (SE); Kari Juhani Leppanen, Kista (SE); Zhixi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/223,385

(22) Filed: Dec. 18, 2018

(65) Prior Publication Data
US 2019/0150043 A1 May 16, 2019

Related U.S. Application Data

(63) Continuation of application No. PCT/EP2016/064569, filed on Jun. 23, 2016.

(51) Int. Cl.
*H04W 36/08* (2009.01)
*H04W 36/30* (2009.01)
(Continued)

(52) U.S. Cl.
CPC .......... *H04W 36/08* (2013.01); *H04L 1/1812* (2013.01); *H04L 1/1822* (2013.01);
(Continued)

(58) Field of Classification Search
CPC . H04W 36/00; H04W 36/0005; H04W 36/02; H04W 36/023; H04W 36/34;
(Continued)

(56) References Cited

U.S. PATENT DOCUMENTS

2004/0053614 A1    3/2004   Il-Gyu et al.
2005/0094600 A1*   5/2005   Zhang .................. H04L 1/1887
                                                          370/331
(Continued)

FOREIGN PATENT DOCUMENTS

CN      101835224 A    9/2010
CN      102172075 A    8/2011
(Continued)

OTHER PUBLICATIONS

International Search Report and Written Opinion issued in International Application No. PCT/EP2016/064569 dated May 8, 2017, 22 pages.

(Continued)

*Primary Examiner* — Warner Wong
(74) *Attorney, Agent, or Firm* — Fish & Richardson P.C.

(57) ABSTRACT

The present disclosure relates to an access network node for a wireless communication system. The access network node is configured to act as a source access network node or as a target access network node, and comprises a transceiver configured to receive a handover instruction from a control device, the handover instruction comprising a handover time instance for a user device, a processor configured to serve the user device by maintaining a data connection with the user device until the handover time instance, and share an Automatic Repeat Request/Hybrid Automatic Repeat Request, ARQ/HARQ, process with a target access network node for the user device; or serve the user device by maintaining a data connection with the user device after the handover time instance, and share a ARQ/HARQ process with a source access network node for the user device.

20 Claims, 7 Drawing Sheets

(I) = before T
(II) = after T

(51) Int. Cl.
*H04L 1/18* (2006.01)
*H04W 36/02* (2009.01)
*H04W 36/38* (2009.01)
*H04W 36/32* (2009.01)
*H04W 36/00* (2009.01)

(52) U.S. Cl.
CPC .......... *H04L 1/1874* (2013.01); *H04W 36/02* (2013.01); *H04W 36/30* (2013.01); *H04W 36/38* (2013.01); *H04L 1/1803* (2013.01); *H04L 1/1835* (2013.01); *H04W 36/0033* (2013.01); *H04W 36/32* (2013.01)

(58) Field of Classification Search
CPC ............. H04W 36/38; H04W 36/0058; H04W 36/0083; H04W 36/08; H04W 36/22; H04W 36/30; H04L 1/18; H04L 1/1812; H04L 1/1864; H04L 1/1896; H04L 47/767; H04L 12/1868; H04L 51/30
See application file for complete search history.

(56) References Cited

U.S. PATENT DOCUMENTS

| | | | | |
|---|---|---|---|---|
| 2005/0111389 | A1* | 5/2005 | Dick | H04W 36/18 370/278 |
| 2006/0094433 | A1* | 5/2006 | Cheng | H04W 36/30 455/439 |
| 2006/0116118 | A1* | 6/2006 | Charriere | H04W 36/30 455/423 |
| 2007/0293226 | A1* | 12/2007 | Lee | H04L 1/1809 455/436 |
| 2011/0038352 | A1* | 2/2011 | Bergman | H04L 1/1812 370/331 |
| 2012/0147855 | A1 | 6/2012 | Pani et al. | |
| 2012/0164979 | A1* | 6/2012 | Bachmann | H04L 63/164 455/411 |
| 2012/0315916 | A1 | 12/2012 | Van Phan et al. | |
| 2013/0044731 | A1* | 2/2013 | Shi | H04L 1/1607 370/331 |
| 2014/0016586 | A1 | 1/2014 | Khan et al. | |
| 2014/0016617 | A1* | 1/2014 | Froberg Olsson | H04W 36/00 370/331 |
| 2015/0029998 | A1 | 1/2015 | Sayenko et al. | |

FOREIGN PATENT DOCUMENTS

| | | |
|---|---|---|
| CN | 102726100 A | 10/2012 |
| CN | 102934479 A | 2/2013 |
| CN | 103385034 A | 11/2013 |
| EP | 2508026 A1 | 10/2012 |
| WO | 2009117660 A2 | 9/2009 |

OTHER PUBLICATIONS

3GPP TSG-RAN WG1 Meeting #33, "Harq Operation during Soft Handover," Panasonic, 10.2 Enhanced Uplink DCH, HARQ, R1-030802, Aug. 25-29, 2003, 4 pages.

Office Action issued in Chinese Application No. 201680086615.8 dated Dec. 4, 2019, 13 pages (With English Translation).

* cited by examiner

HANDOVER BETWEEN A SOURCE ACCESS NODE AND A TARGET ACCESS NODE USING A CONTROL DEVICE

CROSS-REFERENCE TO RELATED APPLICATIONS

This application is a continuation of International Application No. PCT/EP2016/064569, filed on Jun. 23, 2016, the disclosure of which is hereby incorporated by reference in its entirety.

TECHNICAL FIELD

The invention relates to an access network node for a wireless communication system. The invention also relates to a control device for a wireless communication system. Furthermore, the invention also relates to corresponding methods, a computer program, and a computer program product implementing the method.

BACKGROUND

For wireless access networks with a dense deployment of access nodes, handovers between access nodes may be frequently performed. Therefore, added latency and/or possible service interruption times due to handover may be a significant performance limitation in such wireless access networks. These performance limitations may in particular become very problematic in future systems, since higher throughput and lower latency are expected in future wireless/mobile access systems. In current cellular wireless access systems, control plane procedures, i.e. procedures handling control signaling, introduce a certain latency during the handovers. This latency could be avoided in a more dense future user centric wireless/mobile access system. If the latency of the control plane handover can be avoided, the handover of the user plane becomes more critical for the performance in the future wireless access systems than in current wireless access systems. The performance requirements also increase when a new system is introduced, since it is expected that the handover should be performed without any increased packet latency in the new system.

Handover procedures can be classified as hard handovers or soft handovers. In the case of soft handovers, the user device is connected to more than one access node at the same time during the handover, which secures an interruption free service during the handovers. Soft handover is e.g. used in Universal Mobile Telecommunications System (UMTS) networks, where a significant part of the radio protocols is terminated in the Radio Network Controller (RNC) of the system. It is therefore possible to use multiple NodeBs (NBs) to connect the RNC to the User Equipment (UE) in UMTS networks. Soft handover tends to get complex and use additional hardware and spectral resources. For example, in UMTS there is a need to handle handovers between different RNCs, which has led to different RNC roles during a handover and therefore also to increased complexity. UMTS has evolved to use hard handover in High Speed Packet Access (HSPA), where the radio protocol termination has moved to the NB in order to reduce the latency of the air interface.

In hard handover procedures, the UE is only connected to a single access node at any time. This is used in most telecommunication systems, since it allows independent operation of access nodes that implement the whole radio protocol stack. A major drawback of hard handovers is that there is a service interruption during the handover, since the UE is not connected to any access node at the switch from the source access node to the target access node. Despite preparation of the target access node, the service interruption in e.g. Long Term Evolution (LTE) system is normally in the order of 50 ms, during which interruption the UE connects to the target access node. Here, the UE needs to access the Random Access Channel (RACH) channel to assess information of the timing advance of the new cell/access node. The UE therefore has to wait for a RACH opportunity, which causes a delay.

SUMMARY

An object of the embodiments of the invention is to provide a solution which mitigates or solves the drawbacks and problems of conventional solutions.

Another object of the embodiments of the invention is to provide a solution which provides handovers without any service interruptions.

The above object and further object are achieved by the subject matter of the independent claims. Further advantageous implementation forms of the invention are defined by the dependent claims.

According to a first aspect of the invention, the above mentioned and other objects are achieved with an access network node for a wireless communication system, the access network node being configured to act as a source access network node or a target access network node, the access network node comprising
a transceiver configured to
    receive a handover instruction from a control device, the handover instruction comprising a handover time instance for a user device,
a processor configured to
    serve the user device by maintaining a data connection with the user device until the handover time instance, and
    share an Automatic Repeat Request/Hybrid Automatic Repeat Request, ARQ/HARQ, process with a target access network node for the user device; or
    serve the user device by maintaining a data connection with the user device after the handover time instance, and
    share a ARQ/HARQ process with a source access network node for the user device.

Hereby, the handovers can be made seamless, i.e. without service interruptions, even for services with high reliability and low latency requirements. The handover time instance may be set in advance, and both the source access network node and the target access network node may be able to keep/maintain an ARQ/HARQ process which is synchronized with the user device. Hence, the handover can be performed without resetting the ARQ/HARQ protocol state. The access network node may thus act as a source access network node or as a target access network node, depending on the situation.

Automatic Repeat Request (ARQ) is an error control method configured to make data transmission reliable by acknowledging (ACK) successful transmissions. Correspondingly, unsuccessful transmissions are detected either by negative acknowledgements (NACK) or timeouts. Unsuccessful transmissions are repeated up to a maximum number of transmissions.

Hybrid Automatic Repeat Request (HARQ) is a combination of ARQ and error correcting codes. If a data transmission cannot be correctly decoded, the retransmission may include additional parity information which can be used in the decoding process to improve the probability of a correct decoding of the data. Alternatively, the same data can be retransmitted, and the received transmitted and retransmitted signals can be combined to improve the signal to noise ratio. The benefit of HARQ compared to ARQ is that it can make use of all the received transmissions/retransmissions to decode the data.

ARQ/HARQ is normally defined as a protocol between one sender and one receiver. The protocol relies on positive and/or negative acknowledgements (ACK/NACK) to keep the sender and receiver synchronized with respect to which data has been received correctly and which still needs to be transmitted. The ARQ/HARQ protocol often uses sequence numbers of the protocol data units to identify the transmitted data.

In the first aspect of the invention, the concept of a shared ARQ/HARQ process is introduced. According to the shared ARQ/HARQ process, there are instead two entities at one side of the protocol. Thus two sender entities, the source access network node and the target access network node, are temporarily part of the protocol for the DL, although only one of them actually transmits data to the receiver at any one time. In particular, the state of the process is here shared, i.e. both the source access network node and the target access network node keep the same data in the transmit buffer.

Since a dense access network/system allows accurate positioning by use of UpLink (UL) transmissions, it is relatively straightforward to collect accurate statistics for radio performance and user behavior for different geographical positions in the dense access system, in particular since the radio signal will typically propagate over a direct line of sight, with minimal impact of fast fading, in a dense access system. With such radio performance or behavior data available, it is plausible that predictions can be made on the radio channel between the user device/user node (UNd) and the access network nodes (ANds) for a time interval which may be used for handover preparation. Therefore, it is feasible to initiate a handover proactively based on such predictions, which would prevent disruptions of the data plane, i.e. would disrupt carrying of data e.g. to the user device.

In conventional systems, pathloss prediction methods based on measured values in a channel realization can be relatively accurate within a distance of up to one wavelength of the carrier in multipath scenarios, i.e. within a distance where the channel is not coherent but the behavior is relatively predictable. In commonly used carrier frequency bands and vehicular speeds, this distance corresponds to a time period in the order of 10 ms. In a dense wireless access network/system, however, having a large number of access nodes positioned in the system, e.g. at buildings close to the user devices, there will usually be a direct line of sight between at least one access network node and the user device. Also, accurate positioning together with maps of historical measurements may be available, that will further help the accuracy of the prediction. The channel prediction accuracy is also helped by larger bandwidth, since the frequency dependent fading may be averaged out when the whole bandwidth of the signal is considered. High signal to noise ratio also increases the accuracy, since the observations of the channel will reflect the path loss more accurately when the signal to noise ratio is high. Therefore, it may be sufficient to predict the path loss when the noise power is much lower than the signal power. Moreover, since the prediction is made by the access network, the scheduling of resources to the user device may be controlled by the access network rather than being unknown. Therefore, it is mainly the trajectory of the user device which is unknown in these dense systems. Hence, channel prediction for short time periods, such as periods having a length of e.g. tens of milliseconds, with relatively high accuracy is realistic in dense systems, which may be used by some of the implementation forms described herein.

Thus, a handover of very reliable low latency transmissions without any service interruptions is provided by the implementation forms described herein. Also, the presented solutions are simpler than soft handover, since there is no need for joint processing in the presented solutions. The information transfer between the source access network node and the target access network node is minimal. There is further no need to signal between the source access network node and the target access network node, since it is sufficient that the nodes are time synchronized, which they have to be in a time division duplex (TDD) network anyway. Hereby, delays may be avoided. The DL transmissions may also use precoding targeted to the user device, wherefore there is no need for the target access network node to overhear the DL transmission.

In a first possible implementation form of an access network node according to the first aspect, the processor is configured to serve the user device until the handover time instance, and wherein the handover instruction further comprises a network identity or a network address of the target access network node for the user device.
wherein the transceiver is configured to, before the handover time instance,
transmit an ARQ/HARQ sequence number for the ARQ/HARQ process to the target access network node using the network identity or the network address.

By usage of this implementation form, the ARQ/HARQ process in the target access network node may start with the same data packet, or with the same frame or service data unit, and the same sequence number as the ARQ/HARQ process in the source access network node. This may be sufficient to synchronize the shared ARQ/HARQ process of both the source access network node and the target access network node in case the ARQ/HARQ process does not possess additional internal state variables. This may be true, i.e. there may be no additional internal state variables, for an ARQ/HARQ process which is used for very low latency communication where there is only one data packet being transmitted over the air interface at any one time. In this document, the notation data packets, data frames and service data units are used interchangeably when the embodiments are explained.

In a second possible implementation form of an access network node according to the first implementation form of the first aspect, the transceiver is configured to
transmit an internal state information for the ARQ/HARQ process to the target access network node.

Hereby, the ARQ/HARQ process of the source access network node and the target access network node can be synchronized including their internal states. The respective internal state would primarily include packets being available in the transmission and retransmission buffers of the source access network node and the target access network node, respectively. Additional state information may also be available for some embodiments, including e.g. a number of retransmissions that have been made for a packet, timeout values for a packet, and redundancy versions that shall be used for retransmissions.

In a third possible implementation form of an access network node according to the first aspect as such, the processor is configured to serve the user device after the handover time instance, wherein the transceiver is configured to receive a ARQ/HARQ sequence number for the ARQ/HARQ process from the source access network node for the user device before the handover time instance, transmit data packets to the user device according to the ARQ/HARQ sequence number from a retransmit buffer of the target access network node in response to the reception of a Negative Acknowledgement, NACK, from the user device after the handover time instance.

The ARQ/HARQ process in the target access network node may hereby be synchronized with the ARQ/HARQ process in the source access network node. The ARQ/HARQ process in the target access network node may therefore take over both the transmission of new packets and retransmission of packets that have not been correctly received by the user device after the handover time instance. The user device does not need to be aware of the change of transmission point from the source access node to the target access node.

In a fourth possible implementation form of an access network node according to the third implementation form of the first aspect, the processor is configured to update the ARQ/HARQ retransmit buffer in response to reception of an Acknowledgement, ACK, from the user device.

An advantage for this implementation form is that both the source access network node and the target access network node can keep the ARQ/HARQ process updated by updating the retransmit buffer, such that either of them can perform retransmissions if required. The updates of the retransmit buffer may comprise deleting a packet, since the received ACK confirms that the packet has been correctly received, wherefore there is longer a need to keep this packet in the retransmit buffer. In addition, the retransmit buffer may be updated based on timers, i.e. based on time intervals, even if no ACK is received, since the packets may have a limited life time.

In a fifth possible implementation form of an access network node according to any one of the first to fourth implementation forms of the first aspect, or to the first aspect as such, the transceiver is configured to receive reference signals from the user device, wherein the processor is configured to determine a channel measurement report for the user device based on the reference signals, wherein the transceiver is configured to transmit the channel measurement report to the control device.

Hereby, access network nodes may perform measurements based on uplink reference signals, and may get an accurate estimate of the radio channel properties. The measurements can for example be used to position the user device correctly. Since the measurements are transmitted to the control device, it is also possible to use measurements from multiple access network nodes to determine the position of the used device, or to determine which transmission and reception points are the most suitable to serve the user device.

In a sixth possible implementation form of an access network node according to any of the first to fifth implementation forms of the first aspect or to the first aspect as such, the handover instruction further comprises an indication of radio resources allocated for transmission to or from the user device, wherein the transceiver is configured to transmit data to the user device or receive data from the user device using the indicated radio resources.

This implementation form has an advantage in that the target access network node is informed of which radio resources to use for transmissions to and from the user device. Therefore, the target access network node may receive transmissions from the user device, including the ACK and NACK transmissions. The target access network node may then also take over the transmissions to be made to the user device by scheduling its transmissions on the indicated resources for the user device.

According to a second aspect of the invention, the above mentioned and other objects are achieved with a control device for a wireless communication system, the control device comprising a processor configured to obtain a channel measurement report for a user device, determine a handover instruction comprising a handover time instance based on the channel measurement report, a transceiver configured to transmit the handover instruction to a source access network node for the user device, transmit the handover instruction to a target access network node for the user device.

The control node may hereby proactively coordinate the handover of the user device based on channel measurement reports that may come from one or multiple access nodes. By proactively determining the time instance of the handover, it is possible to avoid service interruptions during handovers.

In a first possible implementation form of the control device according to the second aspect, the processor is configured to predict a first channel quality between the source access network node and the user device, and predict a second channel quality between the target access network node and the user device based on at least one of positioning information for the user device, velocity information for the user device, and statistical information about channel quality at different positions for the user device, determine the handover instruction based on the channel measurement report, the first predicted channel quality, and the second predicted channel quality.

Hereby, the control device may perform an accurate prediction of the channel conditions to both the source access network node and to the target access network node for a short prediction interval, e.g. in the range of tens of milliseconds, which is sufficient for preparing the handover. The handover may therefore be performed at the determined time instant with low risk of failures of the radio connection. The statistical information may be collected by many users over long periods of time, which makes a good basis for reliable predictions of the path loss at different locations. Therefore, the control device is aware of areas in which the predictions may be inaccurate, and may avoid making handovers at such locations in order to avoid service interruptions. Alternatively, the control device may use additional safety margins at such locations in order to avoid service interruptions.

In a second possible implementation form of the control device according to the first implementation form of the second aspect or to the second aspect as such, the handover instruction further comprises a network identity or a network address of the target access network node.

The handover instruction may then easily be routed to the correct access network node. Also, the source access network node may send additional information to the target access network node.

In a third possible implementation form of the control device according to any one of the first to second implementation forms of the second aspect or to the second aspect as such, the handover instruction further comprises an indication of radio resources allocated for transmission to or from the user device.

The target access network node may hereby have knowledge of which radio resources it shall use to receive uplink transmissions from the user device while it is served by the source access network node. Also, the target access network node may start scheduling the user device on the same radio resources after the handover time instance. In case the user device has semi permanently scheduled resources, the user device may in some cases be handed over without noticing that a handover has been made at all.

In a fourth possible implementation form of the control device according to any one of the first to third implementation forms of the second aspect or to the second aspect as such, the transceiver is configured to determine a data path re-configuration instruction based on the handover instruction, transmit the data path re-configuration instruction to a gateway configured to control data paths to the user device from a core network.

This implementation form has an advantage in that the data path to the target access network node can be added proactively, and that data can be forwarded to both the source access network node and the target access network nodes for a limited time period before the handover time instance. Since both the access nodes will have access to the downlink data for the user device, they can keep the ARQ/HARQ processes synchronized so that either of them can make retransmissions of the data to the user device.

In a fifth possible implementation form of the control device according to the fourth implementation form of the second aspect, the transceiver is configured to transmit the data path re-configuration instruction to the gateway at a time instance preceding the handover time instance with a predetermined time value.

This implementation form has an advantage in that the control device may send the data path re-configuration instruction with a time margin, which allows the gateway to process the re-configuration message and start forwarding the data packets to the target access network node before the handover time instance. By selecting the time for sending the re-configuration instruction, the control device may determine for which time period the data packets will be forwarded to both the source access network node and the target access network node.

In a sixth possible implementation form of the control device according to the fourth or fifth implementation forms of the second aspect, the data path re-configuration instruction comprises the handover time instance, and a network identity or a network address of the target access network node.

Hereby, the gateway has knowledge of the handover time instance, and may reconfigure the data path to forward data packets also to the target access network node before the handover instance.

According to a third aspect of the invention, the above mentioned and other objects are achieved with a method comprising receiving a handover instruction from a control device, the handover instruction comprising a handover time instance for a user device, serving the user device by maintaining a data connection with the user device until the handover time instance, and sharing an ARQ/HARQ process with a target access network node for the user device; or serving the user device by maintaining a data connection with the user device after the handover time instance, and sharing a ARQ/HARQ process with a source access network node for the user device.

The control node may hereby proactively coordinate the handover of the user device based on channel measurement reports that may come from one or multiple access nodes. By proactively determining the time instance of the handover it is possible to avoid service interruptions. Hereby, the handovers may be seamless even for services with high reliability and low latency requirements. The handover time may be set in advance, and both the source and the target access network node may maintain an ARQ/HARQ process being synchronized with the user device. Hence, the handover can be made without resetting the ARQ/HARQ protocol state.

In a first possible implementation form of a method according to the third aspect, the method further comprises serving the user device until the handover time instance, and wherein the handover instruction further comprises a network identity or a network address of the target access network node for the user device, and transmitting, before the handover time instance, an ARQ/HARQ sequence number for the ARQ/HARQ process to the target access network node using the network identity or the network address.

In a second possible implementation form of a method according to the first implementation form of the third aspect, the method further comprises transmitting an internal state information for the ARQ/HARQ process to the target access network node.

In a third possible implementation form of a method according to the third aspect as such, the method further comprises serving the user device after the handover time instance, receiving a ARQ/HARQ sequence number for the ARQ/HARQ process from the source access network node for the user device before the handover time instance, transmitting data packets to the user device according to the ARQ/HARQ sequence number from a retransmit buffer of the target access network node in response to the reception of a Negative Acknowledgement, NACK, from the user device after the handover time instance.

In a fourth possible implementation form of a method according to the third implementation form of the third aspect, the method further comprises updating the ARQ/HARQ retransmit buffer in response to reception of an Acknowledgement, ACK, from the user device.

In a fifth possible implementation form of the method according to any one of the first to fourth implementation forms of the third aspect, or to the third aspect as such, the method further comprises receiving reference signals from the user device, determining a channel measurement report for the user device based on the reference signals, transmitting the channel measurement report to the control device.

In a sixth possible implementation form of the method according to any of the first to fifth implementation forms of the third aspect or to the third aspect as such, the method further comprises including an indication of radio resources allocated for transmission to or from the user device in a handover instruction, transmitting data to the user device or receive data from the user device using the indicated radio resources.

The advantages for any method according to the third aspect of the present invention are the same as for the corresponding implementation form for the access node according to the first aspect.

According to a fourth aspect of the invention, the above mentioned and other objects are achieved with a method comprising obtaining a channel measurement report for a user device, determining a handover instruction comprising a handover time instance based on the channel measurement report, transmitting the handover instruction to a source access network node for the user device, transmitting the handover instruction to a target access network node for the user device.

The handovers may hereby be seamless even for services with high reliability and low latency requirements. The handover time is set in advance and both the source and the target access network node may maintain an ARQ/HARQ process that is synchronized with the user device. Hence, the handover can be made without resetting the ARQ/HARQ protocol state.

In a first possible implementation form of the method according to the fourth aspect, the method further comprises predicting a first channel quality between the source access network node and the user device, and predict a second channel quality between the target access network node and the user device based on at least one of positioning information for the user device, velocity information for the user device, and statistical information about channel quality at different positions for the user device, determining the handover instruction based on the channel measurement report, the first predicted channel quality, and the second predicted channel quality.

In a second possible implementation form of the method according to the first implementation form of the fourth aspect or to the fourth aspect as such, the handover instruction further comprises a network identity or a network address of the target access network node.

In a third possible implementation form of the control device according to any one of the first to second implementation forms of the fourth aspect or to the fourth aspect as such, the handover instruction further comprises an indication of radio resources allocated for transmission to or from the user device.

In a fourth possible implementation form of the control device according to any one of the first to third implementation forms of the fourth aspect or to the fourth aspect as such, the method further comprises determining a data path re-configuration instruction based on the handover instruction, transmitting the data path re-configuration instruction to a gateway configured to control data paths to the user device from a core network.

In a fifth possible implementation form of the control device according to the fourth implementation form of the fourth aspect, the method further comprises transmitting the data path re-configuration instruction to the gateway at a time instance preceding the handover time instance with a predetermined time value.

In a sixth possible implementation form of the control device according to the fourth or fifth implementation forms of the fourth aspect, the data path re-configuration instruction comprises the handover time instance, and a network identity or a network address of the target access network node.

The advantages of any method according to the fourth aspect are the same as for the corresponding implementation forms for the second aspect.

Embodiments of the invention also relate to a computer program, characterized in code means, which when run by processing means causes said processing means to execute any method according to the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the invention will be apparent from the following detailed description.

BRIEF DESCRIPTION OF THE DRAWINGS

The appended drawings are intended to clarify and explain different embodiments of the invention, in which.

DETAILED DESCRIPTION

In a dense user-centric networks, the user device does not need to be involved in the handover process. It is here sufficient that the source access network node stops scheduling the user device, and that the target access network node takes over the scheduling. Hence, the data plane, or user plane, which carries the data to and from the user device, should be rerouted to the new target access network node without any service interruption. Packet delay and reordering should also be avoided as far as possible in order to minimize the performance impact of the handover on the higher layer processes/procedures. In this document, the notation data plane and user plane are used interchangeably when the embodiments are explained.

Figure 1:
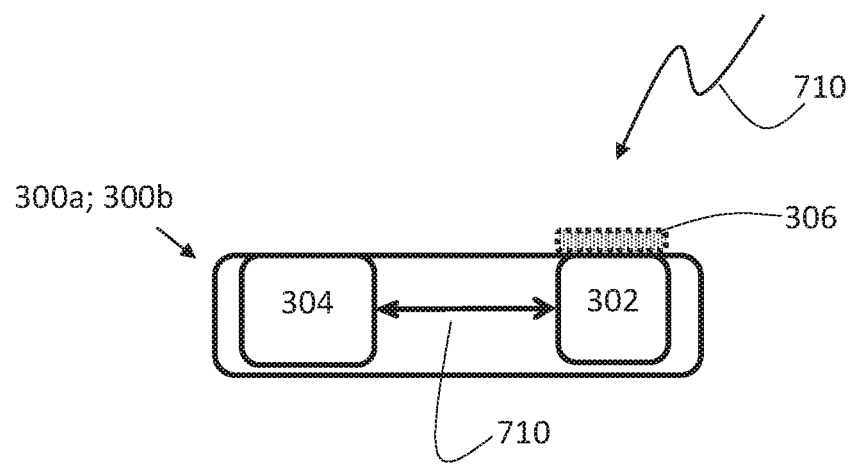
FIG. 1 shows an access network node according to an embodiment of the invention.

FIG. 1 schematically shows an access network node 300*a*, 300*b* for a wireless communication system. The access network node 300*a*, 300*b* is configured to act as a source access node 300*a* or a target access node 300*b* in a handover procedure from a source access node 300*a* to a target access node 300*b* for a user device. The access network node 300*a*, 300*b* comprises a transceiver 302, which is configured to receive a handover instruction 710 from a control device 100. The control device 100 is described below. The handover instruction 710 comprises a handover time instance T for a user device to be handed over from a source access node 300a to a target access node 300b.

The access network node shown in FIG. 1 may thus act as either a source access network node 300a or as a target access network node 300b. If the access network node acts as a source access network node 300a, then it comprises a processor 304 configured to serve the user device by maintaining a data connection with the user device until the handover time instance T, and to share an Automatic Repeat Request/Hybrid Automatic Repeat Request, ARQ/HARQ, process with a target access network node 300b of another access network node for the user device.

If the access network node instead acts as a target access node 300b, it comprises a processor 304 configured to serve the user device by maintaining a data connection with the user device after the handover time instance T, and to share a ARQ/HARQ process with a source access network node 300a for the user device.

Figure 2:
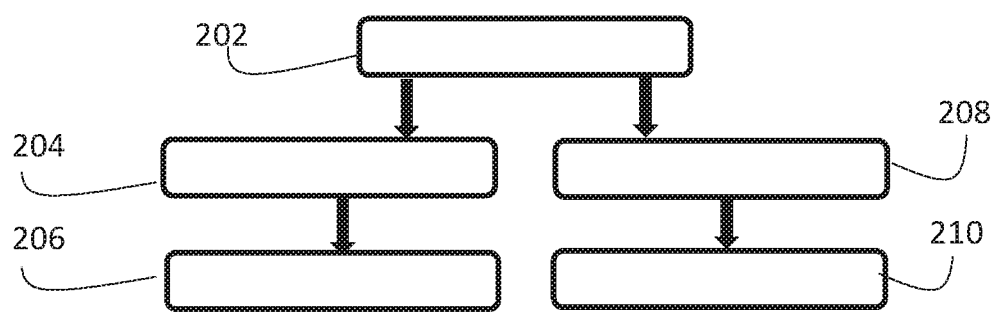
FIG. 2 shows a corresponding method according to an embodiment of the invention.

FIG. 2 shows a flow chart diagram for a corresponding method 200 according to an embodiment of the invention. The method 200 comprises receiving 202 a handover instruction 710 from a control device. The handover instruction 710 comprises a handover time instance T for a user device, as mentioned above.

For a source access network node 300a, the method further comprises, serving 204 the user device by maintaining a data connection with the user device until the handover time instance T, and sharing 206 an ARQ/HARQ process with a target access network node 300b for the user device.

For a target access network node 300b, the method further comprises serving 208 the user device by maintaining a data connection with the user device after the handover time instance T, and sharing 210 a ARQ/HARQ process with a source access network node 300a for the user device.

Figure 3:
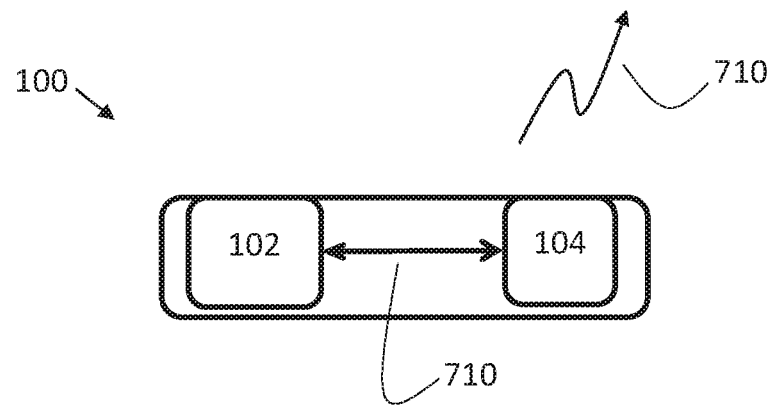
FIG. 3 shows a control device according to an embodiment of the invention.

FIG. 3 schematically shows a control device 100 for use in a wireless communication system. The control device 100 comprises a processor 102, which is configured to obtain a channel measurement report (CMR) for a user device. The processor 102 is further configured to determine a handover instruction 710 comprising a handover time instance T based on the channel measurement report CMR. The control device 100 also comprises a transceiver 104, which is configured to transmit the handover instruction 710 to a source access network node 300a for the user device, and to transmit the handover instruction 710 to a target access network node 300b for the user device. The handover instruction 710 is thus transmitted to the source access network node 300a and to the target access network node 300b in connection with a handover of the user device from the source access network node 300a to the target access network node 300b.

Figure 4:
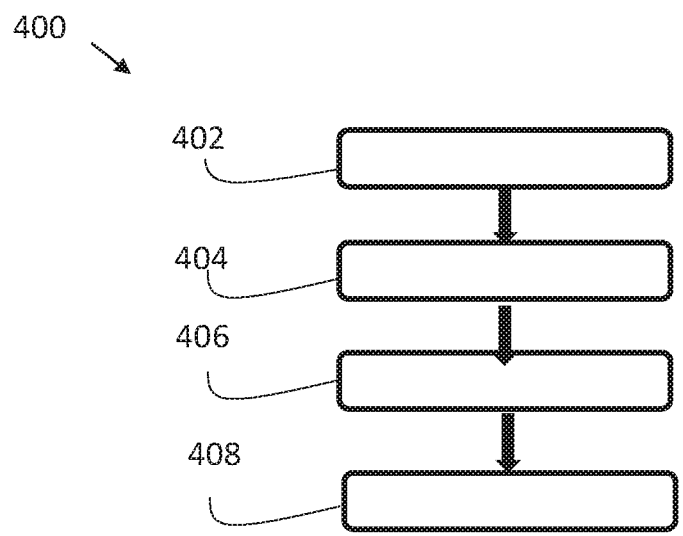
FIG. 4 shows a corresponding method according to an embodiment of the invention.

FIG. 4 shows a flow chart diagram for a corresponding method 400 according to an embodiment of the invention. The method 400 comprises obtaining 402 a channel measurement report for a user device. Also, the method 400 comprises determining 404 a handover instruction 710, which comprises a handover time instance T. The handover instruction 710 is here determined based on the channel measurement report. The handover instruction 710 is then, according to the method 400, transmitted 406 to a source access network node 300a for the user device, and is transmitted 408 to a target access network node 300b for the user device.

Figure 5:
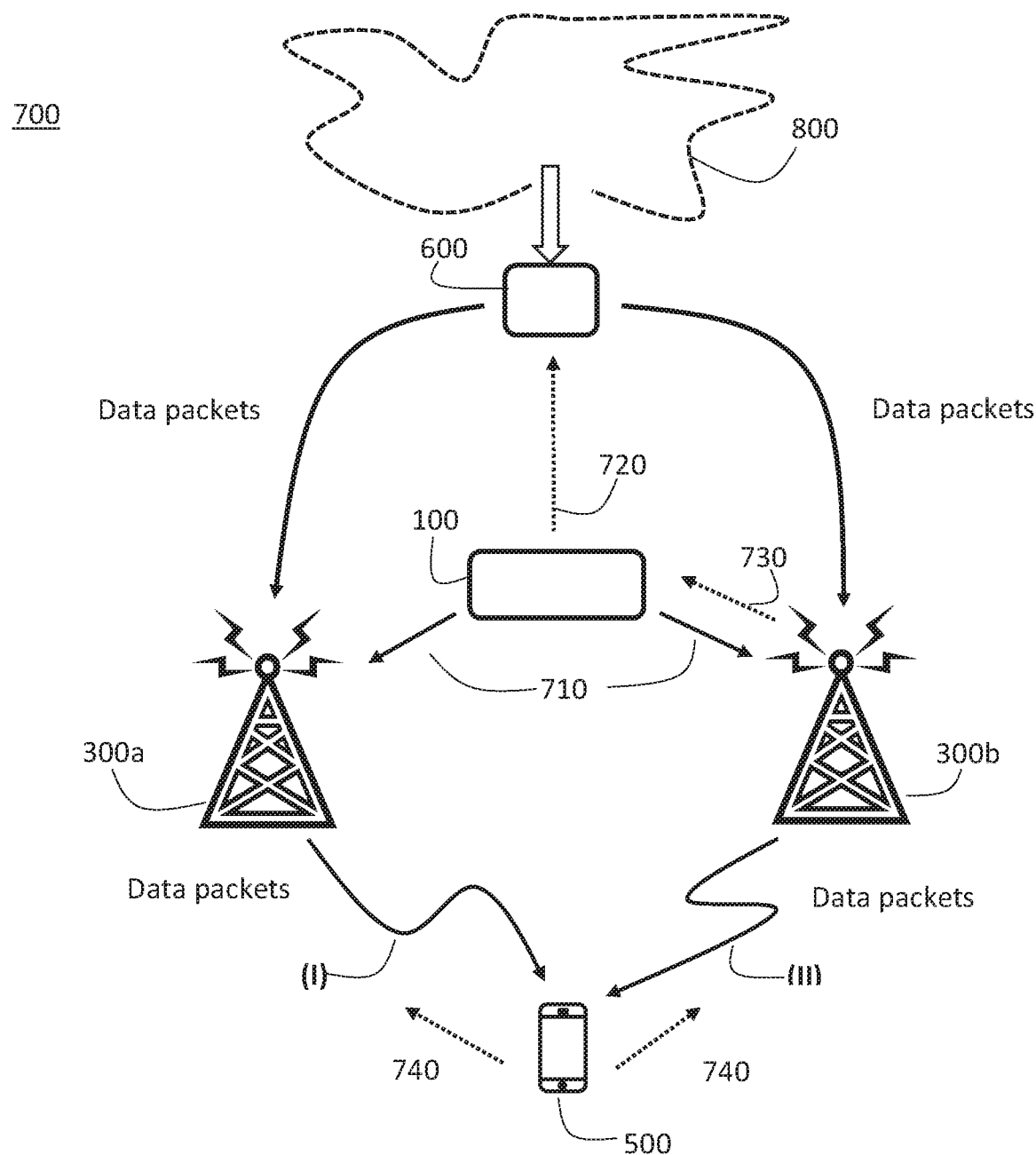
FIG. 5 shows a wireless communication system according to an embodiment of the invention.

FIG. 5 schematically shows a wireless communication system 700. The wireless communication system 700 includes a user device 500, as described above, being handed over from a source access network node 300a to a target access network node 300b. The wireless communication system 700 further includes a control device 100, as described above. The wireless communication system 700 also comprises a gateway 600 being connected to another network 800, such as e.g. a backbone/core network.

According to an embodiment, for which the access network node acts as a source access network node 300a, the processor 304 is configured to serve the user device 500 until the handover time instance T, as is indicated by (I) in FIG. 5. For this embodiment, the handover instruction 710 being received by the source access network node 300a, in addition to the time instant T, further comprises a network identity ID or a network address A of the target access network node 300b for the user device 500. Also, the transceiver 302 is here configured to transmit an ARQ/HARQ sequence number for the ARQ/HARQ process to the target access network node 300b by usage of the network identity ID or the network address A. The sequence number used for the latest packet sent or the next packet to be sent to the user device in the ARQ/HARQ protocol is transmitted to the target access network node before the handover time instance T. Thus, the target access network node 300b, is hereby informed about the sequence number of packet transmissions by the source access network node 300a in order to provide an initial synchronization between the source access network node 300a and the target access network node 300b.

According to an embodiment, for which the access network node acts as a source access network node 300a, the transceiver 302 of the source access network node 300a is further configured to transmit an internal state information for the ARQ/HARQ process to the target access network node 300b. In this document, the internal state information may comprise information related to the packets in the transmission and retransmission buffers 306 (see FIG. 1). The source access network node 300a and the target access network node 300b may both keep copies of the same data packets available for transmission and retransmission to the user device, which means that they then share/have the same internal state. Moreover, the internal state information may also comprise additional state information, such as the number of retransmissions that have been made for a packet, timeout or timer values for a packet, and redundancy versions that shall be used for retransmissions of the packets.

According to an embodiment, for which the access network node acts as a target access network node 300b, the processor 304 of the target access network node 300b is configured to serve the user device 500 after the handover time instance T, as indicated by (II) in FIG. 5. The transceiver 302 of the target access network node 300b is then configured to receive a ARQ/HARQ sequence number for the ARQ/HARQ process from the source access network node 300a for the user device 500 before the handover time instance T. The transceiver 302 of the target access network node 300b is further configured to transmit data packets to the user device 500 according to the ARQ/HARQ sequence number from a retransmit buffer 306 of the target access network node 300b in response to the reception of a NACK from the user device 500 after the handover time instance T. Hereby, the target access network node 300b, is informed about the sequence number of packet transmissions by the source access network node 300a in order to provide an initial synchronization between the source access network node 300a and the target access network node 300b. Also, the processor 304 of the target access network node 300b may be configured to update the ARQ/HARQ retransmit buffer 306 in response to reception of an ACK from the user device 500. Typically, the retransmit buffer 306 is updated by removing packets from the retransmit buffer 306 when they have been successfully received and acknowledged by the user device. The sequence synchronization between the source access network node 300*a* and the target access network node 300*b* may be maintained in the target access network node 300*b* just by taking the ACK/NACK from the user device 500 already before time instant T into consideration. The sequence synchronization may also be performed in parallel both in the source access network node 300*a* and in the target access network node 300*b*.

According to an embodiment, the transceiver 302 of the access network node is configured to receive reference signals 740 (see FIG. 5) from the user device 500. The processor 304 is then configured to determine a channel measurement report for the user device 500 based on the reference signals 740. The transceiver 302 is then also configured to transmit the channel measurement report 730 to the control device 100.

According to an embodiment, the processor 102 of the control device 100 is configured to predict a first channel quality between the source access network node 300*a* and the user device 500, and to predict a second channel quality between the target access network node 300*b* and the user device 500 based on at least one of positioning information P for the user device 500, velocity information for the user device 500, and statistical information about channel quality at different positions for the user device 500. The processor 102 of the control device is further configured to determine the handover instruction 710 based on the channel measurement report, the first predicted channel quality, and the second predicted channel quality. As mentioned above, the channel measurement report (CMR) 730 may be provided to the control device 100 by the access network node.

Thus, a radio access network can use uplink transmissions of reference signals 740 to make position estimates of a user device 500. A control node 100 in the access network makes a prediction of the future trajectory of the user device 500, e.g. for 100 ms, and its channel quality. These predictions may be made based on stored information about the radio channel quality and user velocities mapped to geographical locations. In addition, the user device position and velocity, channel measurements for the channel between user device and its serving access network node, and the load for different possible target access network nodes 300*b* are used to determine the time instance T when the handover of the radio link shall be performed in order to result in good system performance. To avoid any interruptions in the transmission during the handover, the handover is made at a point in time T for which the channel quality is predicted to be good both for the source access network node 300*a* and for the target access network node 300*n*. Also, the source access network node 300*a* and the target access network node 300*b* may receive UL signaling for a short period to increase robustness. The criteria for a good quality connection can be expressed in terms of sufficient received signal power, signal to noise ratio, or signal to noise and interference ratio to be above a suitable threshold, or in terms of the radio link being in-sync, i.e. synchronized. Radio link failure may be defined as a radio link not being synchronized, i.e. as being out of sync.

According to an embodiment, the handover instruction 710 further comprises an indication of radio resources R allocated for transmission to or from the user device 500. The transceiver 302 of the access network node 300*a*, 300*b* may then be configured to transmit data to the user device 500 or receive data from the user device 500 by usage of the radio resources R indicated in the handover instruction. Also, the handover instruction 710 may further comprise a network identity ID or a network address A of the target access network node 300*b*. As mentioned above, the network identity ID or the network address A may be used by the source access network node 300*a* for transmitting an ARQ/HARQ sequence number for the ARQ/HARQ process to the target access network node 300*b*.

According to an embodiment, the transceiver 104 of the control device 100 is configured to determine a data path re-configuration instruction 720 based on the handover instruction 710. The transceiver 104 is further configured to transmit the data path re-configuration instruction 720 to a gateway 600 configured to control data paths to the user device 500 from a core network 800. The data path re-configuration instruction 720 may comprise the handover time instance T, and a network identity ID or a network address A of the target access network node 300*b*. The data path re-configuration instruction 720 may be transmitted to the gateway 600 at a time instance preceding the handover time instance T with a predetermined time value which is selected to give the gateway 600 sufficient time to process the message and to reconfigure the forwarding tables to include the new path before the data is needed in the target access network node 300*b*.

The handover of the user device 500 from a source access network node 300*a* to a target access network node 300*b* comprises first preparing the target access network node control plane, such as a protocol instance, e.g. a radio resource control protocol instance, by sending the used user device context to the predicted target access network node 300*b*. The user device context comprises the information needed to provide service for the user device 500. This may include security information, such as encryption keys, information about ongoing sessions, information about bearers and tunnels, and information about radio configuration parameters. For the UL, it is possible to forward the packets, i.e. to continue the packet flow, as soon as the user device 500 is connected to the target access network node 300*b*, if the target access network node 300*b* has received the user device context.

According to an embodiment, the UL packets may be forwarded by the source access network node 300*a* until the decided handover time instance T, and thereafter the UL packets are forwarded by the target access network node 300*b*. In such an embodiment, there may be a responsible Packet Data Convergence Protocol (PDCP) instance in the access network node 300*a*, 300*b*, which handles the bearer/flow of the user device 500 at any moment, and the handling PDCP would then change at the handover time instance T. A sequence number, e.g. a PDCP sequence number, may be transferred from a source PDCP entity to a target PDCP entity just before or at the time instance T of the handover to make sure that each packet is forwarded once. The source PDCP and the target PDCP entity may be located in the source access network node 300*a* and the target access network node 300*b*, respectively.

According to another embodiment, the UL packets received by both the source access network node 300*a* and the target access network node 300*b* may be forwarded to the gateway 600, which may then either detect and remove duplicates, e.g. based on sequence numbers. Alternatively, both of the packets may be forwarded to the destination.

In some cases, the target access network node 300*b* may belong to a different IP-network than the source access network node 300*a*. The handover preparation may then include preparing a new IP-address to be used as a mobile IP care-of-address after the handover has been performed. In the case of network based mobility, i.e. where the user device 500 does not need to be involved in mobility-related signaling, such a new IP-address may be provided in advance using e.g. mobile interne protocol version 6 (IPv6) fast handover. This can be prepared without any involvement of the user device 500, and the forwarding policies may thus easily be reconfigured.

The radio interface handover itself comprises a change of the access network node which schedules traffic to and from the user device 500. Since a significant overlap in coverage can be expected in a dense access network, it is unlikely that a radio link failure is caused by small errors in the handover time period, even if some performance degradation may occur. The most critical issue is therefore the time instance T of switching the DL data path from the source access network node 300*a* to the target access network node 300*b*, which may be reliably determined by use of the herein described implementation forms.

In the following disclosure, a number of exemplary embodiments are described more in detail for providing a deeper understanding of the present solution. Sequence diagrams for the signaling between the user device 500, the source access network node 300*a*, the target access network node 300*b*, the control node 100 and the gateway 600 are here used for illustrating the embodiments.

Figure 6:
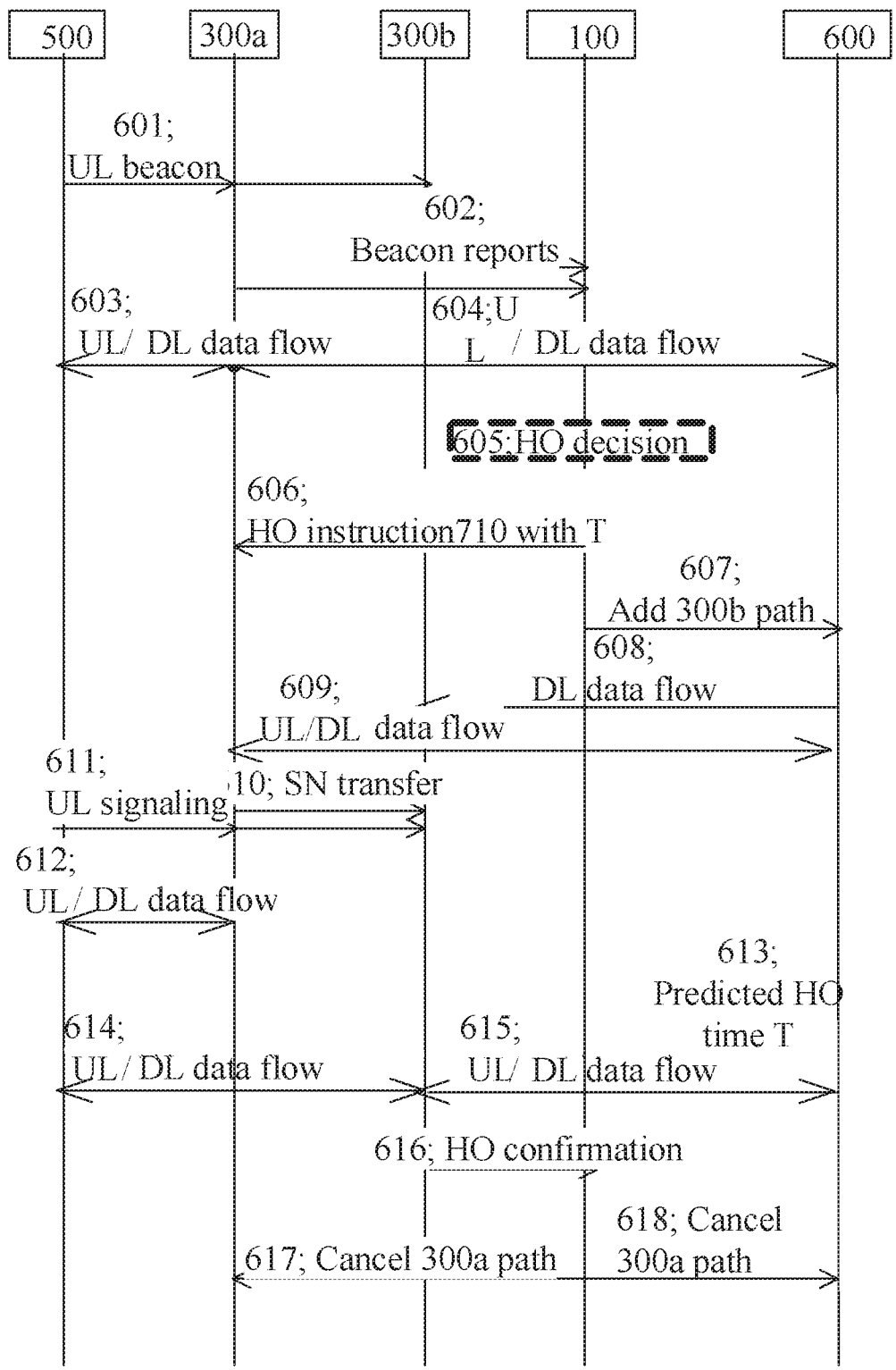
FIG. 6 shows a sequence diagram for an embodiment of the invention.

In the first exemplary embodiment, schematically illustrated in FIG. 6, a proactive handover is performed, in which the control node 100 decides 605 when a handover shall be performed and to which target access network node 300*b* the user device 500 should be handed over. Before the handover, UL/DL data flows 603, 604 are provided via the source access network node 300*a*, and beacon reports are provided 601, 602 to the control unit 100 by the source access network node 300*a* and the target access network node 300*b*. When the control device 100 prepares the involved source access network node 300*a* and target access network node 300*b*, the control device 100 also informs 606 the source access network node 300*a* and the target access network node 300*b* about the handover timing, i.e. about the time instance T, by sending the handover instruction 710 described above. A data path to the target access network node 300*b* is added 607 by signaling to the gateway 600, and a DL data flow is then sent 608 to the target access network node 300*b*. The UL/DL data flows 609 are still provided via the source access network node 300*a*. Then, UL signaling 611 is performed from the user device 500 to both the source access network node 300*a* and the target access network node 300*b*, and UL/DL data flow is provided 612 via the source access network node 300*a*.

After the actual handover 613 has taken place at the time instance T, the UL/DL data flow is provided 614, 615 via the target access network node 300*b*. The target access network node 300*b* sends a handover confirmation 616, and the data path to the source access network node 300*a* is cancelled 617, 618.

Also, geographical maps including statistics, such as e.g. averages, distributions, moments, or correlations, of measured values of signal strength, or alternatively Signal to Noise Ratio (SNR) or Signal to Interference and Noise Ratio (SINR), and optionally typical user device trajectories, including speed, together with information about the traffic load in an area, may be used to determine a preferred location suitable for the handover. The preferred location may be determined based on the predicted radio channel qualities for both the source access network node 300*a*, and for the candidate target access network nodes 300*b*.

The control device 100 may apply a number of different optimization targets, such as e.g. load balancing, interference limitation, fairness, or system throughput maximization. The throughput maps are collected by measurements of user SNR/SINR or throughput, or velocities, over longer time periods, in order to acquire statistically relevant information for the predicted radio conditions and the user velocities. Also, time correlation values may potentially be stored, to be used for predicting e.g. changes in the user device velocity, or changes in a user device direction based on the velocity. To improve the accuracy of the handover decision, the control device 100 may avoid to select handover positions where the predictions cannot be reliably provided with an acceptable accuracy, e.g. due to high uncertainty of the information in the maps.

The time instance T when a user device 500 will reach the preferred handover location may be predicted based on the user device position and the user device speed, as derived e.g. using angle of arrival, time of arrival, Doppler shift or received power measured by one or more access network nodes from one or more UL beacon transmissions 601, 602. Based on this predicted time instant, the above mentioned handover time instance T may then be determined. The handover time instance T, which may be an absolute or a relative time instance, is then according to various herein described embodiments included in the handover instruction 710 being sent 606 from the control device 100 to the source access network node 300*a* and to the target access network node 300*b*.

Then, a data plane downlink path for a flow or a class of flows to the target access network node 300*b* is added 607, 608 before the handover time instance T. Also, the target access network node 300*b* may be informed 610 about the sequence number of packet transmissions by the source access network node 300*a*, or by the gateway 600, whereby an initial synchronization between the source access network node 300*a* and the target access network node 300*b* is achieved. For flows/classes with different latency requirements the forwarding/flow of the packets may be different. For example, particular flows which require low packet latency may have to be delivered to the source access network node until the handover time instance T.

According to some embodiments, multiple target access network nodes 300*b* may be prepared by receiving necessary user device context information included in the handover instruction 710 being sent 606 to the target access network nodes 300*b* from the control node 100. The handover may also proceed with multiple target access network nodes in the second step. In this case there is a need for the user device 500 to handle the reception of multiple DL transmissions. The control node 100 will then coordinate the resources used for transmissions such that it is possible for the user device 500 to receive the multiple transmissions, that may e.g. include separate frequency, time or spatial resources, or that may be transmitted in such a way that they can be coherently combined. The user device 500 would then merge and filter the received transmissions. The control node 100 may select one target access network node 300*b* to handle the user device 500 when the handover is completed based on the channel quality it estimates from the UL beacons 602 received by the different target access network nodes 300*b*.

Figure 7:
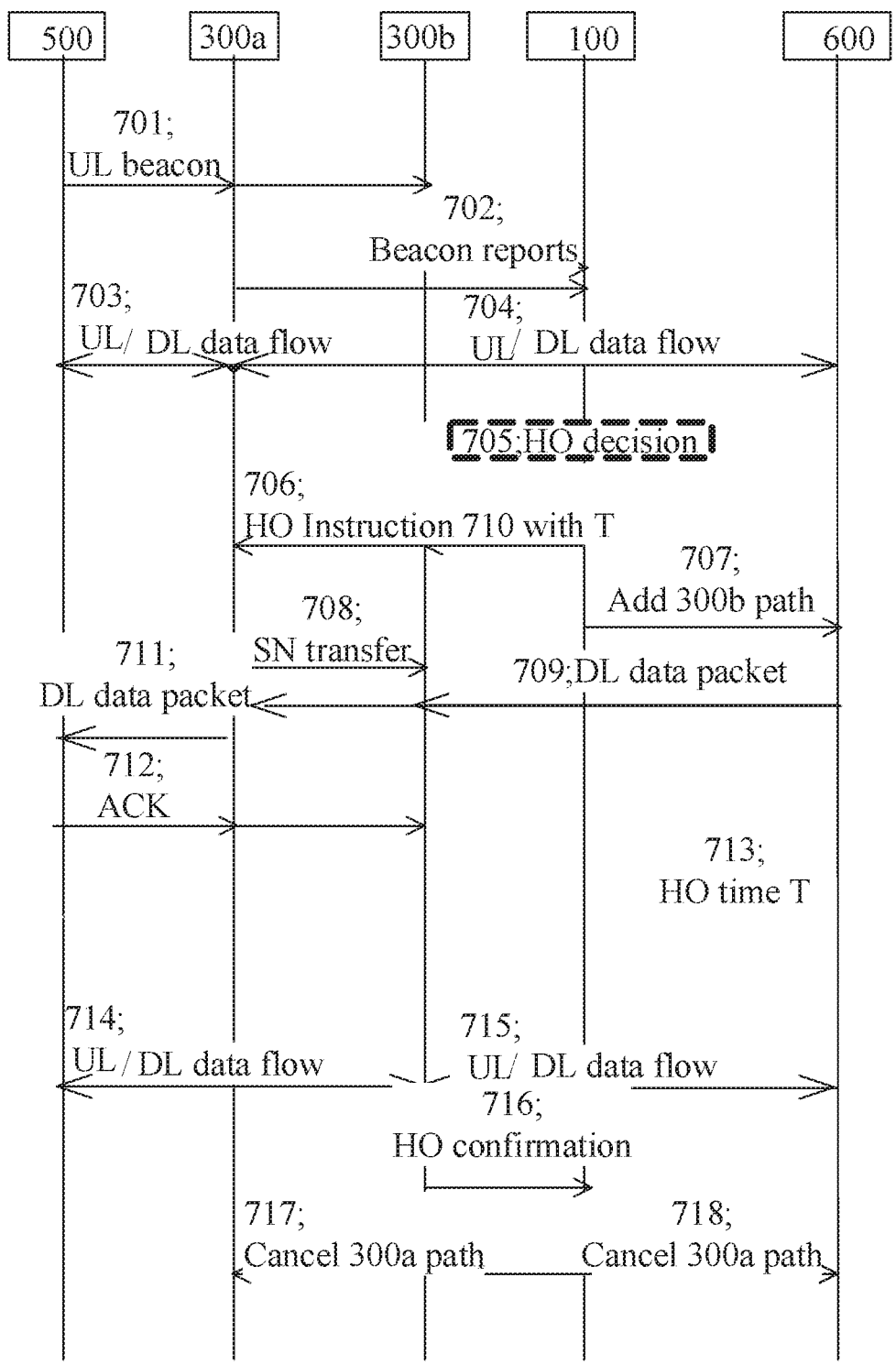
FIG. 7 shows a sequence diagram for an embodiment of the invention.
Figure 8:
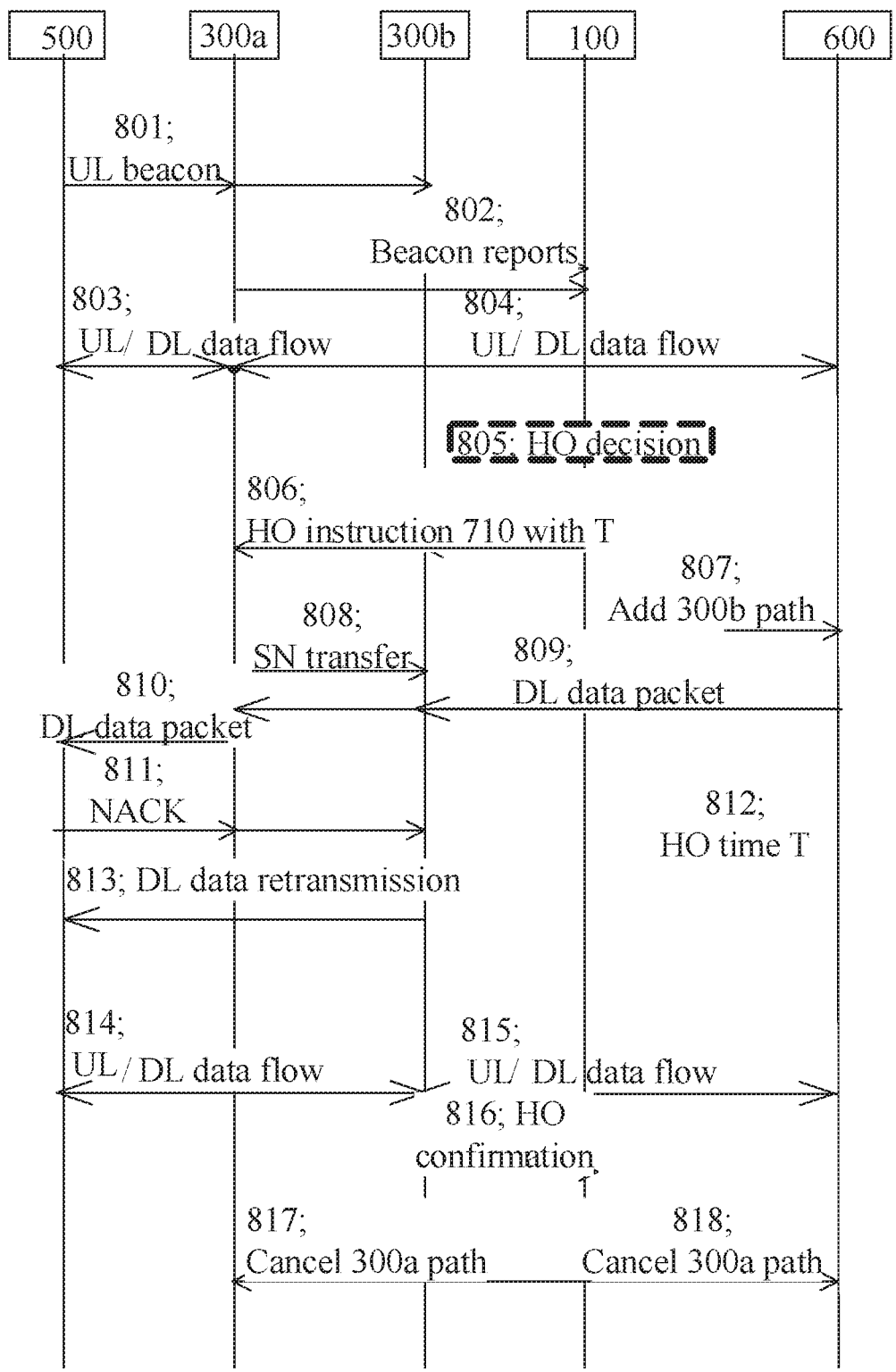
FIG. 8 shows a sequence diagram for an embodiment of the invention.

Second and third exemplary embodiments are schematically illustrated in FIG. 7 and FIG. 8. Most of the steps of the procedure illustrated in FIG. 7 and FIG. 8 correspond to the steps illustrated in FIG. 6 and described above. Additional steps of FIG. 7 and FIG. 8 in relation to FIG. 6, including ARQ/HARQ signaling steps, are described in the following.

To avoid performance degradation, the proactive handover according to the herein described embodiments may require that some data packets are forwarded to both of the source access network node 300a and the target access network node 300b. For low latency high priority traffic, there will not be much data being transmitted at a single moment in time. It may thus be sufficient to add the new path to the target access network node 300b just before the actual handover 713 is performed, with enough margin to avoid that there is any glitch/interruption in the service due to processing delays.

This may mean that packets are forwarded to both the source access network node 300a and the target access network node 300b during a short time period, e.g. one millisecond. Both the source access network node 300a and the target access network node 300b should also receive the UL signaling, in particular the ACK/NACK signaling 712 from the user device 500. For low latency services it can be assumed that ARQ/HARQ protocols will be very simple due to the very low latency tolerance. For example, it may be possible to use a single process stop and wait protocol, for which there can only be one data packet under transmission or retransmission to the user device at any one time. A new packet that arrives to the access network node will here have to wait until the packet under transmission has been successfully received and acknowledged by the user device. It is therefore feasible to synchronize the ARQ/HARQ process in the source access network node 300a and in the target access network node 300b based on reception of the ACK/NACK feedback 712. If the DL data transmission 711 from the source access network node 300a can be decoded by the user device 500, the user device 500 responds with a ACK 712, as is illustrated in FIG. 7.

However, if the DL data transmission 810 from the source access network node 300a cannot be decoded by the user device 500, the user device 500 responds with a NACK 811, and the target access network node 300b may make a retransmission 813 of the DL data transmission if the handover time has passed, as is illustrated in FIG. 8.

When the handover has been completed, the target access network node 300a may according to an embodiment send a confirmation message 616, 716, 816 indicating that the handover was successful. Since the target access network node 300b knows the time instance T when the user device 500 will be handed over, it can determine, based on received UL transmissions, that the user device 500 does not have an acceptable connection, e.g. if the UL beacons 601, 602, 701, 702, 801, 802 are not arriving at all. The control node 100 can cancel 617, 618, 717, 718, 817, 818 the data path to the source access network node 300a when the handover is confirmed 616, 716, 816 to be completed. According to an embodiment, the target access network node 300b will only send a negative confirmation message 616, 716, 816 in case the handover was not successful. Since the handover time instance T is known, the control node 100 can then cancel the data path to and from the source access network node 300a after the handover time instance without any further acknowledgement from the source access network node 300a, based on the lack of negative feedback about handover failure.

To minimize the latency of the services with very strict requirements, the network may allocate resources for a user device 500 with very short periodicity, which may apply to both UL and DL resources. For the DL, this may be used such that the user device 500 does not need to receive a notification before the packet transmission. Both for DL and UL, the scheduling of the resources will change from the source access network node 300a to the target access network node 300b at the time instance T of the handover. The target access network node 300b may use received UL beacon transmissions, such as e.g. position tracking in a line-of-sight environment, to configure its receive filters, in order to receive UL transmissions from the user device 500 reliably.

According to an embodiment, areas for which it is difficult to make accurate predictions of location, speed or throughput are identified in the radio maps to support the parameter setting for the handover. The identification of the problematic areas may be performed by observing performance problems which may result from prediction errors. In particular, it is useful to observe performance issues related to the handover procedure to identify problematic areas. The identification of the problematic geographical areas can be made based on observations of performance for all user devices over a relatively long time period, as a form of self-optimization. The selection of the suitable handover positions may depend on the information from such a prediction accuracy map.

According to an embodiment, timing signaling for the data plane nodes that forward the data packets may also be included e.g. in Open Flow and Forwarding Policy Configuration (FPC) protocols. This means that an additional information element may be included which informs the data plane nodes about a time instance when a change of the forwarding table should be applied. According to another embodiment, the control node 100 is configured to send the data plane configuration messages 607, 707 at the time when the nodes should be reconfigured, possibly with an appropriate time margin for the processing time.

Figure 9:
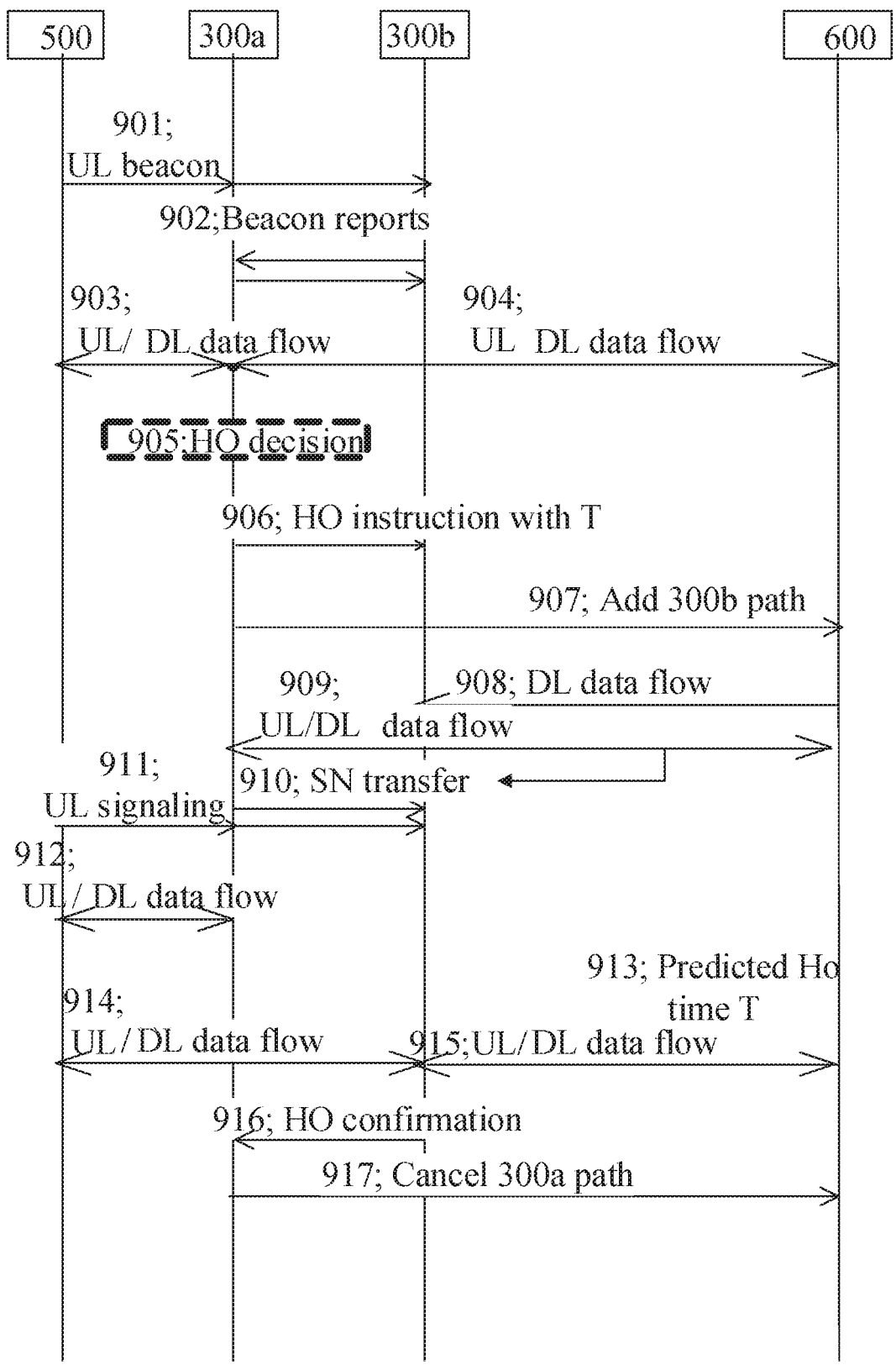
FIG. 9 shows a sequence diagram for an embodiment of the invention

A fourth exemplary embodiment is schematically illustrated in FIG. 9. Most of the steps of the procedure illustrated in FIG. 9 correspond to the steps illustrated in FIG. 6 and described above. However, for the procedure illustrated in FIG. 9, there is no separate control node in the network. The source access network node 300a is then instead in control of the handover timing T according to this embodiment. Also, the source access network node 300a handles most of the tasks that the control node handles in the other embodiments described above.

It is also illustrated in FIG. 9 that the target access network node 300b may send a confirmation message 916 to the source access network node 300a when the handover is complete, and that the source access network node 300a signals 917 to the user plane gateway 600 to cancel the initial path once this confirmation has been received.

Thus, the herein described embodiments provides for a proactive determination of the time instance T when a handover will be executed. The source access network node and the target access network node are informed of this handover time instance T. The data plane downlink path may be switched for each flow/quality class at the handover time instance T. Also, an initial synchronization of the target access network node 300b may be provided at the handover, and the ARQ/HARQ process may be maintained synchronized during the handover by reception of the ACK/NACK messages in both source access network node 300a and target access network node 300b.

Also, geographical maps with statistics, such as e.g. averages, distributions, or moments, of measured values of signal strength, alternatively SNR, SINR, may be used together with information about the traffic load in an area to determine a preferred location for a handover. The handover time instance T may then be determined based on the position and speed of the user. The statistical measures of the variance, deviation or distribution may be used to determine the uncertainty of the prediction, and to avoid handovers in areas where either of the links are unpredictable.

Also, a forwarding policy configuration message 607, 707 from the control node 100 to a data plane node, i.e. the gateway 600, may be provided with an execution time.

The access network node 300a, 300b described herein may also be denoted as an access node or an access point or a base station, e.g., a Radio Base Station (RBS), which in some networks may be referred to as transmitter, "eNB", "eNodeB", "NodeB", "gNB" or "B node", depending on the technology and terminology used. The access network nodes may be of different classes such as, e.g., macro eNodeB, home eNodeB or pico base station, based on transmission power and thereby also cell size. The access network node can be a Station (STA), which is any device that contains an IEEE 802.11-conformant Media Access Control (MAC) and Physical Layer (PHY) interface to the Wireless Medium (WM). The access network node 300a, 300b may also be a network node in a wired communication system. Further, standards promulgated by the IEEE, the Internet Engineering Task Force (IETF), the International Telecommunications Union (ITU), the 3GPP standards, fifth-generation (5G) standards and so forth are supported. In various embodiments, the network node 400 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs, and/or 3GPP LTE standards. The access network node 300a, 300b may communicate information according to one or more of the Digital Video Broadcasting Terrestrial (DVB-T) broadcasting standard and the High performance radio Local Area Network (HiperLAN) standard.

A user device 500 described herein may be any of a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). Further, standards promulgated by the IEEE, the Internet Engineering Task Force (IETF), the International Telecommunications Union (ITU), the 3GPP standards, fifth-generation (5G) standards and so forth, are supported. In various embodiments, the receiving device 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs, and/or 3GPP LTE standards. The receiving device 100 may communicate information according to one or more of the Digital Video Broadcasting Terrestrial (DVB-T) broadcasting standard and the High performance radio Local Area Network (HiperLAN) standard.

Furthermore, any methods according to embodiments of the invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the transceivers 302, 104 described herein comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors 304, 102 described herein may in an embodiment comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. Access network node for a wireless communication system, the access network node being configured to act as a source access network node or a target access network node, the access network node comprising a transceiver and at least one processor, wherein:
   the transceiver is configured to:
      receive a handover instruction from a control device, the handover instruction comprising a handover time instance (T) and a network identity (ID) or a network address (A) of a target access network node for a user device; and
      before the handover time instance (T), transmit an Automatic Repeat Request/Hybrid Automatic Repeat Request (ARQ/HARQ) sequence number for an ARQ/HARQ process to the target access network node using the network identity (ID) or the network address (A); and
   the at least one processor is configured to:
      serve the user device by maintaining a data connection with the user device until the handover time instance (T); and share the ARQ/HARQ process with the target access network node for the user device; or serve the user device by maintaining a data connection with the user device after the handover time instance (T); and share the ARQ/HARQ process with a source access network node for the user device.

2. The access network node according to claim 1, wherein the transceiver is configured to transmit an internal state information for the ARQ/HARQ process to the target access network node.

3. The access network node according to claim 1, wherein:
the at least one processor is configured to serve the user device after the handover time instance (T); and
the transceiver is configured to:
receive an ARQ/HARQ sequence number for the ARQ/HARQ process from the source access network node for the user device before the handover time instance (T); and
transmit data packets to the user device according to the ARQ/HARQ sequence number from an ARQ/HARQ retransmit buffer of the target access network node in response to the reception of a Negative Acknowledgement (NACK) from the user device after the handover time instance (T).

4. The access network node according to claim 3, wherein the at least one processor is configured to update the ARQ/HARQ retransmit buffer in response to reception of an Acknowledgement (ACK) from the user device.

5. The access network node according to claim 1, wherein:
the transceiver is configured to receive reference signals from the user device;
the at least one processor is configured to determine a channel measurement report (CMR) for the user device based on the reference signals; and
the transceiver is configured to transmit the channel measurement report (CMR) to the control device.

6. The access network node according to claim 1, wherein the handover instruction further comprises an indication of radio resources (R) allocated for transmission to or from the user device, and wherein the transceiver is configured to transmit data to the user device or receive data from the user device using the indicated radio resources (R).

7. A control device for a wireless communication system, the control device comprising at least one processor and a transceiver, wherein:
the at least one processor is configured to:
obtain a channel measurement report (CMR) for a user device;
determine a handover instruction comprising a handover time instance (T) based on the channel measurement report (CMR); and
determine a data path re-configuration instruction based on the handover instruction; and
the transceiver is configured to:
transmit the data path re-configuration instruction to a gateway configured to control data paths to the user device from a core network;
transmit the handover instruction to a source access network node for the user device; and
transmit the handover instruction to a target access network node for the user device.

8. The control device according to claim 7, wherein the at least one processor is configured to:

predict a first channel quality between the source access network node and the user device;
predict a second channel quality between the target access network node and the user device based on at least one of positioning information (P) for the user device, velocity information for the user device, and statistical information about channel quality at different positions for the user device; and
determine the handover instruction based on the channel measurement report (CMR), the first predicted channel quality, and the second predicted channel quality.

9. The control device according to claim 7, wherein the handover instruction further comprises a network identity (ID) or a network address (A) of the target access network node.

10. The control device according to claim 7, wherein the handover instruction further comprises an indication of radio resources (R) allocated for transmission to or from the user device.

11. The control device according to claim 7, wherein the transceiver is configured to:
transmit the data path re-configuration instruction to the gateway at a time instance preceding the handover time instance (T) with a predetermined time value.

12. The control device according to claim 7, wherein the data path re-configuration instruction comprises the handover time instance (T), and a network identity (ID) or a network address (A) of the target access network node.

13. A method, comprising:
receiving a handover instruction from a control device, the handover instruction comprising a handover time instance (T) and a network identity (ID) or a network address (A) of a target access network node for a user device;
before the handover time instance (T), transmitting an Automatic Repeat Request/Hybrid Automatic Repeat Request (ARQ/HARQ) sequence number for an ARQ/HARQ process to the target access network node using the network identity (ID) or the network address (A);
serving the user device by maintaining a data connection with the user device until the handover time instance (T); and
sharing the ARQ/HARQ process with the target access network node for the user device; or
serving the user device by maintaining a data connection with the user device after the handover time instance (T); and
sharing the ARQ/HARQ process with a source access network node for the user device.

14. A method comprising:
obtaining a channel measurement report (CMR) for a user device;
determining a handover instruction comprising a handover time instance (T) based on the channel measurement report (CMR);
determining a data path re-configuration instruction based on the handover instruction;
transmitting the data path re-configuration instruction to a gateway configured to control data paths to the user device from a core network;
transmitting the handover instruction to a source access network node for the user device; and
transmitting the handover instruction to a target access network node for the user device.

15. The method according to claim 13, further comprising transmitting an internal state information for the ARQ/HARQ process to the target access network node.

16. The method according to claim 13, further comprising:
   receiving reference signals from the user device;
   determining a channel measurement report (CMR) for the user device based on the reference signals; and
   transmitting the channel measurement report (CMR) to the control device.

17. The method according to claim 13, wherein the handover instruction further comprises an indication of radio resources (R) allocated for transmission to or from the user device, and wherein the method further comprises transmitting data to the user device or receiving data from the user device using the indicated radio resources (R).

18. The method according to claim 14, further comprising:
   predicting a first channel quality between the source access network node and the user device;
   predicting a second channel quality between the target access network node and the user device based on at least one of positioning information (P) for the user device, velocity information for the user device, and statistical information about channel quality at different positions for the user device; and
   determining the handover instruction based on the channel measurement report (CMR), the first predicted channel quality, and the second predicted channel quality.

19. The method according to claim 14, wherein the handover instruction further comprises a network identity (ID) or a network address (A) of the target access network node.

20. The method according to claim 14, wherein the handover instruction further comprises an indication of radio resources (R) allocated for transmission to or from the user device.

* * * * *